(12) United States Patent  (10) Patent No.: US 7,076,481 B2
Osborne et al.  (45) Date of Patent: Jul. 11, 2006

(54) METHOD AND APPARATUS FOR LOGICALLY RECONSTRUCTING INCOMPLETE RECORDS

(75) Inventors: Brian Osborne, Cedar Park, TX (US); Charles A. Priddy, Austin, TX (US)

(73) Assignee: BMC Software, Inc., Houston, TX (US)

( * ) Notice: Subject to any disclaimer, the term of this patent is extended or adjusted under 35 U.S.C. 154(b) by 489 days.

(21) Appl. No.: 10/395,915

(22) Filed: Mar. 24, 2003

(65) Prior Publication Data

US 2003/0217040 A1    Nov. 20, 2003

Related U.S. Application Data

(63) Continuation of application No. 09/255,348, filed on Feb. 23, 1999, now abandoned.

(60) Provisional application No. 60/080,153, filed on Mar. 31, 1998.

(51) Int. Cl.
    G06F 17/30  (2006.01)
    G06F 12/00  (2006.01)
(52) U.S. Cl. .................. 707/3; 707/100; 707/202; 714/20
(58) Field of Classification Search .......... 707/1–5, 707/100–102, 200–204, 8; 711/160–162; 717/8, 11; 714/16, 19–20
    See application file for complete search history.

(56) References Cited

U.S. PATENT DOCUMENTS

| 5,423,037 | A |   | 6/1995 | Hvasshovd |
| 5,440,735 | A |   | 8/1995 | Goldring |
| 5,613,113 | A | * | 3/1997 | Goldring ............... 707/202 |
| 5,721,915 | A | * | 2/1998 | Sockut et al. ............... 707/200 |
| 5,721,918 | A |   | 2/1998 | Nilsson et al. |
| 5,745,674 | A |   | 4/1998 | Lupton et al. |
| 5,745,750 | A |   | 4/1998 | Porcaro |
| 5,778,387 | A | * | 7/1998 | Wilkerson et al. .......... 707/202 |
| 5,778,388 | A | * | 7/1998 | Kawamura et al. ......... 707/203 |
| 5,781,910 | A |   | 7/1998 | Gostanian et al. |
| 5,794,252 | A |   | 8/1998 | Bailey et al. |
| 5,806,075 | A |   | 9/1998 | Jain et al. |

(Continued)

FOREIGN PATENT DOCUMENTS

EP         0501160 A2      9/1992

(Continued)

OTHER PUBLICATIONS

Ross S Finlayson et al. "Log files: An extended file service exploiting write-once storage",Proceedings of the eleventh ACM symposium on operating systems principles, 1987, pp. 139-148.*

(Continued)

*Primary Examiner*—Srirama Channavajjala
(74) *Attorney, Agent, or Firm*—Vinson & Elkins L.L.P.

(57) ABSTRACT

The present invention reconstructs and illustrates incomplete change records by initially selecting an initial change record. The initial change record describes a change made to a target data object located at a target location in an electronic database. Next, a transaction log associated with the electronic database is searched for change records which modify the target data object. Eventually, a particular change record is located which contains a complete copy of the data object. Finally, the change records are applied to the complete copy of the data object, thereby bringing the complete copy of the target data object to a state as it existed before the change described by the initial change record was made to the target data object.

32 Claims, 5 Drawing Sheets

U.S. PATENT DOCUMENTS

| | | | | |
|---|---|---|---|---|
| 5,819,066 | A * | 10/1998 | Bromberg et al. | 707/102 |
| 5,832,508 | A * | 11/1998 | Sherman et al. | 707/200 |
| 5,862,318 | A * | 1/1999 | Habben | 714/20 |
| 5,873,096 | A * | 2/1999 | Lim et al. | 707/201 |
| 5,890,154 | A * | 3/1999 | Hsiao et al. | 707/8 |
| 5,903,898 | A | 5/1999 | Cohen et al. | |
| 5,907,848 | A * | 5/1999 | Zaiken et al. | 707/202 |
| 5,953,728 | A | 9/1999 | Horowitz et al. | |
| 5,953,729 | A * | 9/1999 | Cabrera et al. | 707/204 |
| 5,995,980 | A | 11/1999 | Olson et al. | |
| 6,014,674 | A * | 1/2000 | McCargar | 707/202 |
| 6,029,178 | A | 2/2000 | Martin et al. | |
| 6,032,158 | A | 2/2000 | Mukhopadhyay et al. | |
| 6,122,630 | A * | 9/2000 | Strickler et al. | 707/8 |
| 6,122,640 | A * | 9/2000 | Pereira | 707/103 R |
| 6,324,693 | B1 * | 11/2001 | Brodersen et al. | 717/177 |
| 6,449,623 | B1 * | 9/2002 | Bohannon et al. | 707/202 |
| 2002/0107837 | A1 | 8/2002 | Osborne et al. | |
| 2003/0217040 | A1 * | 11/2003 | Osborne et al. | 707/1 |

FOREIGN PATENT DOCUMENTS

| | | | | |
|---|---|---|---|---|
| EP | 0646868 | A1 * | 4/1995 | 11/32 |
| EP | 0743609 | A2 | 11/1996 | |
| EP | 1577775 | A1 * | 9/2005 | 11/14 |
| WO | WO 99/23849 | * | 5/1999 | 7/34 |
| WO | WO 03/098465 | * | 11/2003 | |
| WO | WO 2004/031897 | A2 * | 4/2004 | 17/30 |

OTHER PUBLICATIONS

Goncalves,Bianka M.M.T et al. "data updating between the operational and analytical databases through dw-log algorithm",proceedings of the 9th international database engineering &application symposium,Jul. 2005, pp. 77-82.*

Andrew rutherford et al. "Towards a hippocratic log file architecture", ACM international conference proceedings series, vol. 75, annual researh conference on the sourth african institute of computer scientists and information technologists on IT research in developing countries, 2004, pp. 186-193.*

Jeanna Neefe Mathews et al. "improving the performance of log-structured file systems with adaptive methods", proceedings of the sixteenth ACM symposium on operatinting systems principles, 1997, pp. 238-251.*

Mendel Rosenblum et al. "The design and implementation of a log-structured file system",ACM transactions on computer systems, vol. 10, issue 1, Feb. 1992, pp. 26-52.*

* cited by examiner

METHOD AND APPARATUS FOR LOGICALLY RECONSTRUCTING INCOMPLETE RECORDS

REFERENCE TO EARLIER FILED APPLICATION

This application is a continuation of U.S. patent application Ser. No. 09/255,348 is now abandoned, filed Feb. 23, 1999, to Brian Osborne and Charles A. Priddy, entitled "METHOD AND APPARATUS FOR LOGICALLY RECONSTRUCTING INCOMPLETE RECORDS," hereby incorporated herein by reference.

This application claims the benefit of U.S. Provisional Application No. 60/080,153, filed Mar. 31, 1998.

BACKGROUND OF THE INVENTION

1. Technical Field

The present invention relates generally to database programs implemented on data processing systems. Specifically, the present invention identifies changes made to rows contained in a database by analyzing the database management system's transaction log data.

2. Description of the Related Art

Large electronic databases have become common-place items on many of today's large computer systems. These electronic databases, and the database management programs which manipulate and make accessible the data in the database, allow vast amounts of information to be stored in an orderly, easily retrievable manner. Most large corporations now rely heavily on the information contained in these electronic databases. However, computer systems and electronic data systems still experience unexpected failures which can result in the loss of some or all of the data contained in an electronic database.

One way to combat these unexpected failures is to periodically make backup copies of the database. However, for large databases, this can be a time consuming process and can only be done infrequently. To supplement these backup copies of the database, many database management programs maintain a record of the changes that are made to the database. The information describing the changes made to a database is often known as transaction log data. This log data can be kept in files or other virtual storage devices known as transaction logs. Transaction logs are useful in recovering lost data because they often contain all of the changes that have been made to a database from the point in time a backup was made to the present. For example, assume that a backup of a database is taken on a Monday and that a transaction log containing all of the changes that were made to the database from that point on is maintained. If the database "crashes" or becomes unusable on Friday, the changes stored in the transaction log from the time the backup was taken on Monday until the time the database became unusable can be implemented to the Monday version of the database to restore the database.

Although the transaction log contains much useful information, tools which make use of this information are few in number. For instance, sometimes the entire database will not crash, but a portion of the database will be found to contain incorrect information. This incorrect information could be the result of a failure of the computer system's hardware or software, or, due to human error, the information could simply have been incorrectly entered into the database. Normally, when such an error is discovered, the entire database has to be brought back to the last known correct state. Using the example discussed above, suppose an error is discovered in the database on Thursday, and the backup of the database taken on Monday is known to be a good copy, without the error. In order to correct the error, the Monday backup copy of the database is used in place of the copy of the database which contains the error. This results in restoring the database to a known, valid state. However, all of the entries made to the database from Monday to Thursday are lost and have to be reentered.

Thus, a method which utilizes transaction log data and allows for the inspection of the changes made to individual rows would be useful. Such a method would examine the transaction log data and recreate rows in the database as they existed before and after a change. Displaying the rows in such a manner would put the changes described in the transaction log data in context and would allow a user to more fully utilize the contents of the transaction log data.

SUMMARY OF THE INVENTION

Therefore, it is one object of the present invention to access the transaction log to reconstruct a complete image of a row as it existed before and after a change was made to the row.

It is yet another object of the present invention to reconstruct a complete image of the row even if some of the transaction log information relating to the location, size, and relative offset of the row is incomplete.

It is still another object of the present invention to first access the transaction log to obtain the data necessary to present the rows to the user, then, if all of the data cannot be found in the transaction log, to access a backup of the database or the database itself.

When characterized as a method, the present invention achieves these and other objects as follows. Initially, an initial change record is selected. The initial change record describes a change made to a target data object located at a target location in an electronic database. Next, a transaction log associated with the electronic database is searched for change records which modify the target data object. Eventually, a particular change record is located which contains a complete copy of the data object. Finally, the change records are applied to the complete copy of the data object, thereby bringing the complete copy of the target data object to a state as it existed before the change described by the initial change record was made to the target data object. The present invention can also be characterized in other forms to achieve similar objectives. The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

Figure 1:
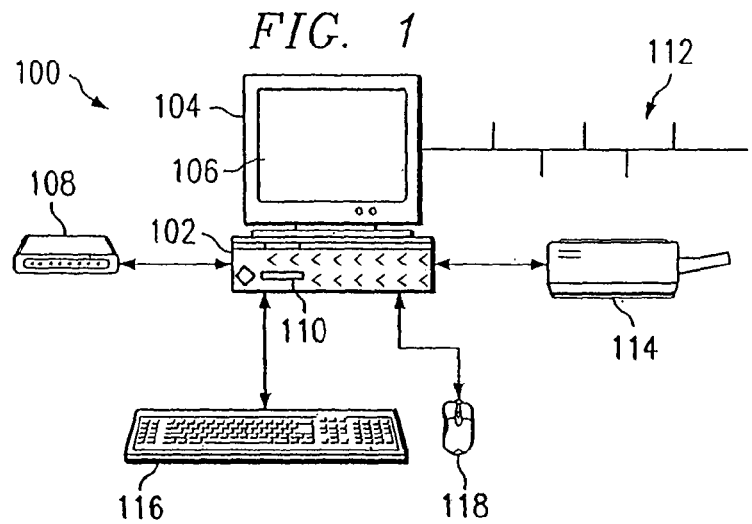
FIG. 1 depicts a general purpose data processing system upon which the present invention can be implemented.

FIG. 1 depicts data processing system 100, which includes processor 102 and display 104. Display 104 includes display screen 106, which may be implemented utilizing a cathode ray tube (CRT), a liquid crystal display (LCD), an electroluminescent panel, or the like. Data can be entered into data processing system 100 by means of a mouse 118 or keyboard 116. In addition to mouse 118 and keyboard 116, data can be entered using a track ball, joystick, touch sensitive tablet or screen, trackpad, or glidepad. Mouse 118 may be utilized to move a pointer or cursor on display screen 106. Processor 102 may also be coupled to one or more peripheral devices, such as modem 108, and disk drive 110, each of which may be internal or external to the enclosure of processor 102. Data processor may also be connected to network 112 in order to communicate with other computing units. Network 112 may be implemented as a local intranet, or the network of computers known as the Internet. An output device such a printer 114 may also be coupled to processor 102.

Those persons skilled in the art of data processing system design should recognize that display 104, keyboard 116, and the pointing device 118 may each be implemented utilizing any one of several known off-the-shelf components. Data processing system 100 may be implemented utilizing any general purpose computer or so-called "personal computer" or "workstation", such as those sold by Compaq, Dell, Apple, Sun, and others.

Figure 2:
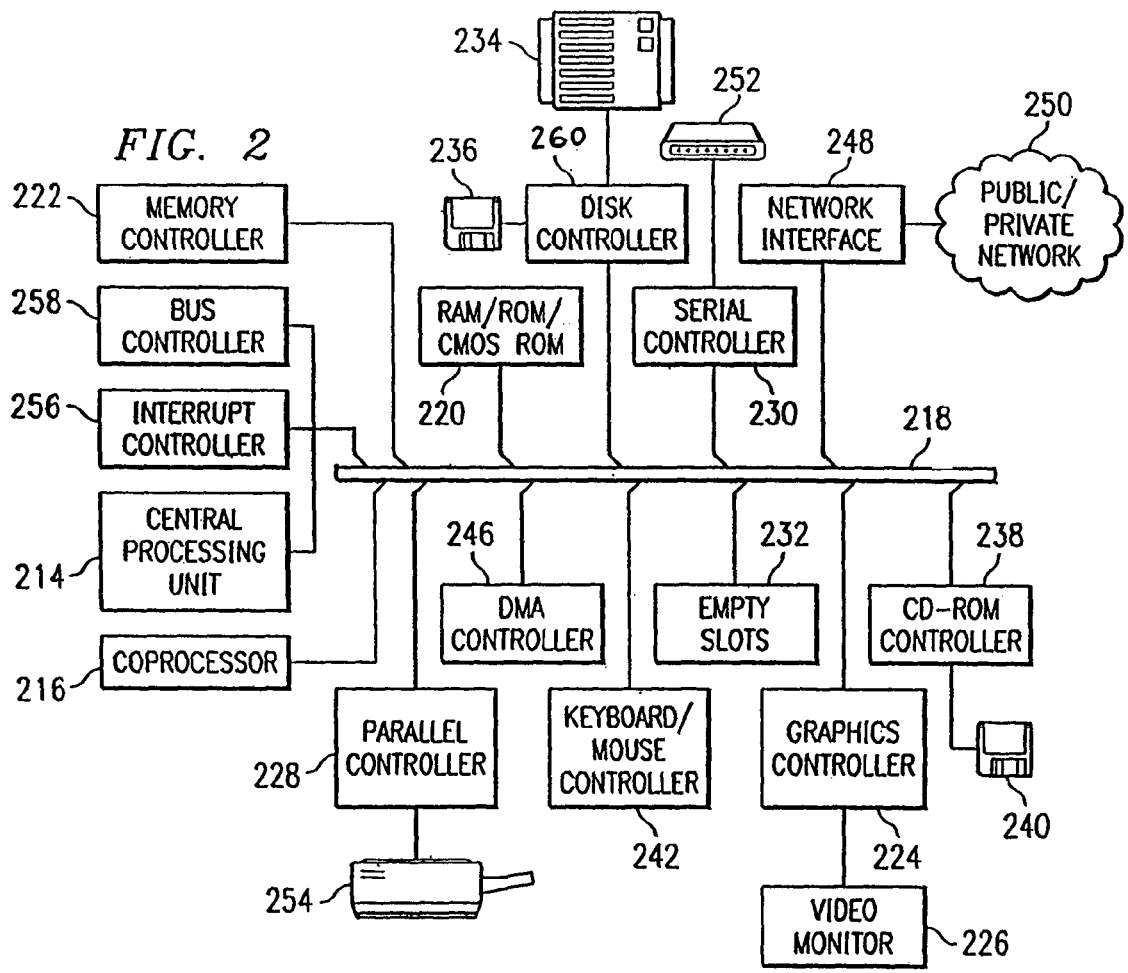
FIG. 2 is a high level block diagram which further illustrates the major components that may be included in the data processing system of FIG. 1.

With reference now to FIG. 2, there is depicted a high level block diagram which further illustrates the major components that may be included in data processing system 100 of FIG. 1. Data processing system 100 is controlled primarily by computer readable instructions, which may be in the form of software, wherever, or by whatever means such software is stored or accessed. Such software may be executed within central processing unit (CPU) 214 to cause data processing system 100 to do work. In many workstations and personal computers, central processing unit 214 is implemented by a single-chip CPU called a microprocessor. An example of such a microprocessor is the microprocessor sold under the trademark "PENTIUM" by Intel Corporation.

Coprocessor 216 is an optional processor, distinct from main CPU 214, that performs additional functions or assists CPU 214. One common type of coprocessor is the floating-point coprocessor, also called a numeric or math coprocessor, which is designed to perform numeric calculations faster and better than general-purpose CPU 214. Recently, however, the functions of many coprocessors have been incorporated into more powerful single-chip microprocessors.

CPU 214 fetches, decodes, and executes instructions, and transfers information to and from other resources via the computer's main data-transfer path, system bus 218. System bus 218 connects the components in data processing system 100 and defines the medium for data exchange. System bus 218 typically includes data lines for sending data, address lines for sending addresses, and control lines for sending interrupts and for operating the system bus. In some embodiments, system bus 218 uses the same lines for both data and address communications. An example of such a system bus is the PCI (Peripheral Component Interconnect) bus. Many system busses provide a function called bus arbitration that regulates access to the bus by extension cards, controllers, and CPU 214. Devices that attach to such a system bus and arbitrate to take-over the bus are called bus masters.

Memory devices 220 are coupled to system bus 218, and include random access memory (RAM), read only memory (ROM), and nonvolatile memory. Such memories include circuitry that allows information to be stored and retrieved. ROMs contain stored data that cannot be modified. Data stored in RAM can be read or changed by CPU 214 or other hardware devices. Nonvolatile memory is memory that does not lose data when power is removed from it. Nonvolatile memories include ROM, EPROM, EEPROM, bubble memory, or battery-backed CMOS RAM. As shown in FIG. 2, such battery-backed CMOS RAM may be utilized to store system configuration information.

Access to RAM, ROM, and nonvolatile memory may be controlled by memory controller 222 and bus controller 258. Memory controller 222 may provide an address translation function that translates virtual addresses into physical addresses as instructions are executed. Memory controller 222 may also provide a memory protection function that isolates processes within the system and isolates system processes from user processes. Thus, a program running in user mode can access only memory mapped by its own process virtual address space; it cannot access memory within another process's virtual address space unless memory sharing between the processes has been arranged.

An expansion card or expansion board is a circuit board that includes chips and other electronic components connected in a circuit. Expansion boards are used to add functions or resources to the computer. Typical expansion cards include memory cards, disk controller 260, graphics controller 224, parallel port 228, serial port 230, and internal modems. For laptop, palmtop, and other portable computers, expansion cards usually take the form of PC Cards, which are credit card-size devices designed to plug into a slot in the side or back of a computer. An example of such a slot is the PCMCIA slot (Personal Computer Memory Card International Association) which defines type I, II and III card slots. Thus, empty slots 232 may be used to receive various types of expansion cards or PCMCIA cards.

Disk controller 260 includes special-purpose integrated circuits and associated circuitry that direct and control reading from and writing to hard disk drive 234 and floppy disk or diskette 236. Such disk controllers handle tasks such as positioning the read/write head, mediating between the drive and the microprocessor, and controlling the transfer of information to and from memory.

CD-ROM controller 238 may be included in data processing 100 for reading data from CD-ROMs 240 (compact disk read-only memory). Such CD-ROMs use laser optics rather than magnetic means for reading data.

Keyboard/mouse controller 242 is provided in data processing system 100 for interfacing with a keyboard and/or a pointing device, such as mouse. Such pointing devices are typically utilized to control an on-screen element, such as a cursor, which may take the form of an arrow having a hot-spot that specifies the location of the pointer when the user presses a mouse button. Other pointing devices include the graphics tablet, the stylus, the light pen, the joystick, the puck, the trackball, and the trackpad.

Direct memory access (DMA) controller 246 may be used to provide a memory access that does not involve CPU 214. Such memory access is typically employed to transfer data directly between memory and an "intelligent" peripheral device, such as between memory 220 and disk controller 260.

Communication between data processing system 100 and other data processing systems may be facilitated by serial controller 230 and network adaptor 248, both of which are coupled to system bus 218. Serial controller 230 is utilized to transmit information between computers, or between a computer and peripheral devices, one bit at a time over a single line. Serial communications can be synchronous (controlled by some time standard such as a clock) or asynchronous (managed by the exchange of control signals that govern the flow of information). Examples of serial communications standards include the RS-232 interface and the RS-422 interface.

As illustrated, such a serial interface may be utilized to communicate with modem 252. A modem is a communications device that enables a computer to transmit information over a standard telephone line. Modems convert digital computer signals to analog signals suitable for communication over telephone lines. Modem 252 may provide a connection to sources of software, such as a server, an electronic bulletin board, and the Internet or World Wide Web.

Network adapter 248 may be used to connect data processing system 100 to local area network 250. Network 250 may provide computer users with means of communicating and transferring software and information electronically. Additionally, network 250 may provide distributed processing, which involves several computers and the sharing of workloads or cooperative efforts in performing a task.

Video monitor 226, which is controlled by graphics controller 224, is used to display visual output generated by data processing system 100. Such visual output may include text, graphics, animated graphics, and video. Video monitor 226 may be implemented with a CRT-based video display, an LCD-based flat-panel display, or a gas plasma-based flat-panel display. Graphics controller 224 includes the electronic components required to generate a video signal that is sent to video monitor 226.

Printer 254 may be coupled to data processing system 100 via parallel controller 228. Printer 254 is used to put text or a computer-generated image on paper or on another medium, such as a transparency. Other types of printers may include an image setter, a plotter, or a film recorder.

Parallel controller 228 is used to send multiple data and control bits simultaneously over wires connected between system bus 218 and another parallel communication device, such as printer 254. The most common parallel interface is the IEEE 1284 Centronics interface.

During data processing operations, the various devices connected to system bus 218 may generate interrupts which are processed by interrupt controller 256. An interrupt is a request for attention from CPU 214 that can be passed to CPU 214 by either hardware or software. An interrupt causes the microprocessor to suspend currently executing instructions, save the status of the work in progress, and transfer control to a special routine, known as an interrupt handler, that causes a particular set of instructions to be carried out. Interrupt controller 256 may be required to handle a hierarchy of interrupt priorities and arbitrate simultaneous interrupt requests. Interrupt controller 256 may also be used to temporarily disable interrupts.

Figure 3:
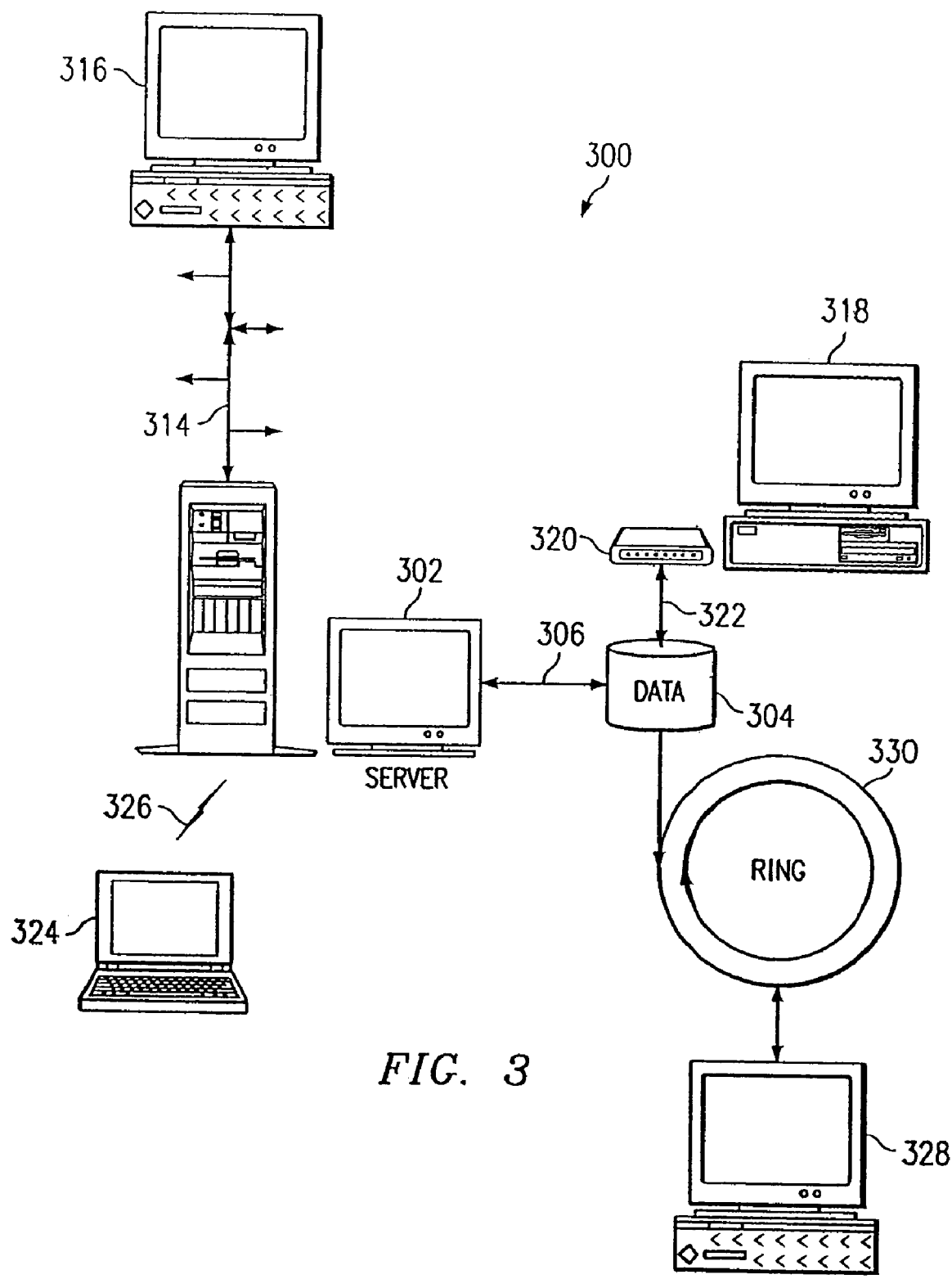
FIG. 3 illustrates a computer network upon which the present invention can be implemented.

FIG. 3 illustrates a computer network according to the present invention. Central to network 300 is server 302 and data storage device 304. Server 302 is connected to data storage device 304 via communications link 306. Server 302 and data storage device 304 operate to store and process data for the computing devices connected to network 300. Workstation 316 is connected to server 302 via Ethernet 314. This connection can be accomplished in many ways, as known in the art. Not shown in FIG. 3 are the bridges, routers, multiplexers, and other intermediate devices which are commonly found in an Ethernet network. In other embodiments, Ethernet network 314 could be comprised of an ATM network. ATM networks generally have the ability to transfer more data than comparable Ethernet type networks.

Personal computer 318 is connected to server 302 using modem 320. Modem 320 allows personal computer 318 to send and receive digital signals over public telephone network 322. Using a modem allows users to access server 302 when they do not have access to a network connection. However, sending and receiving data using a modem is generally slower than sending and receiving data over a network such as Ethernet network 314.

Laptop computer 324 is connected to server 302 via wireless network 326. This type of connection can be used by persons operating in the field. Wireless network 326 can be implemented using satellites, cellular technology, Packet technology, or other generally available wireless communication protocols.

Computer 328 is connected to server 302 via FDDI network 330. FDDI network 330 is usually implemented with a fiber optic cable. Generally, fiber optic cables have a much greater bandwidth than traditional copper transmission lines.

Figure 4:
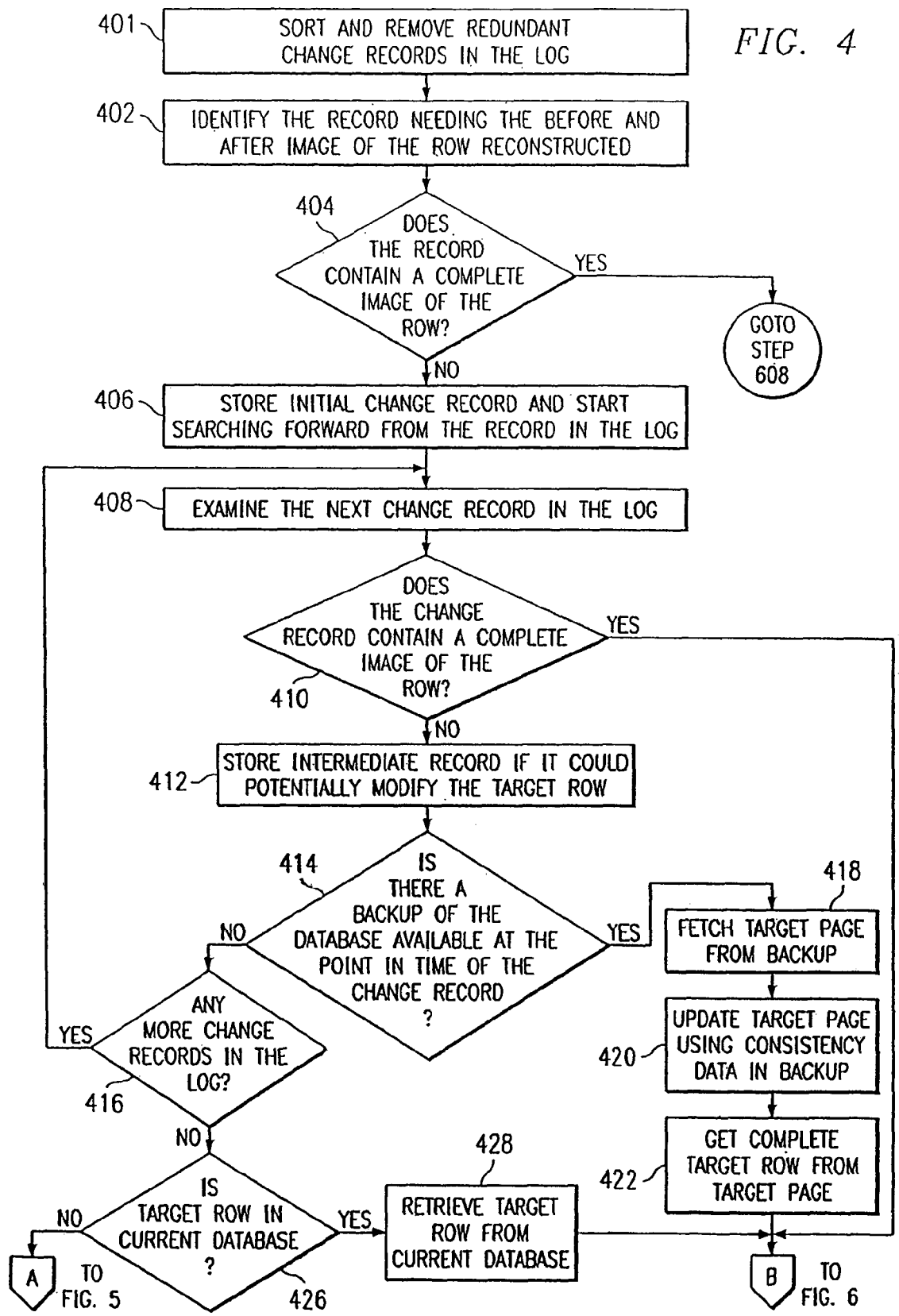
FIG. 4 is a flowchart which illustrates a portion of the method according to the present invention.
Figure 5:
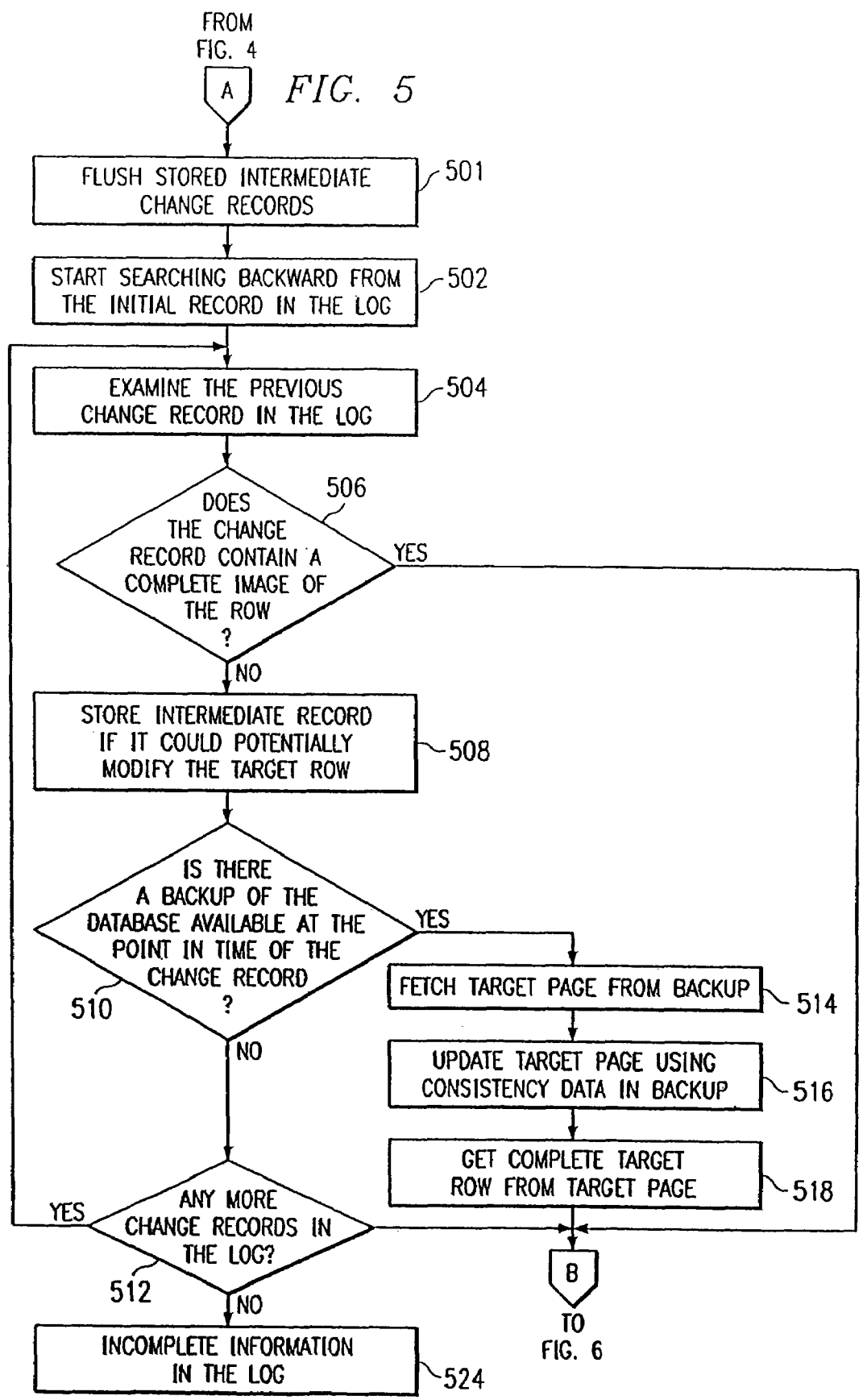
FIG. 5 is a flowchart which continues the illustration of the method shown in FIG. 4.
Figure 6:
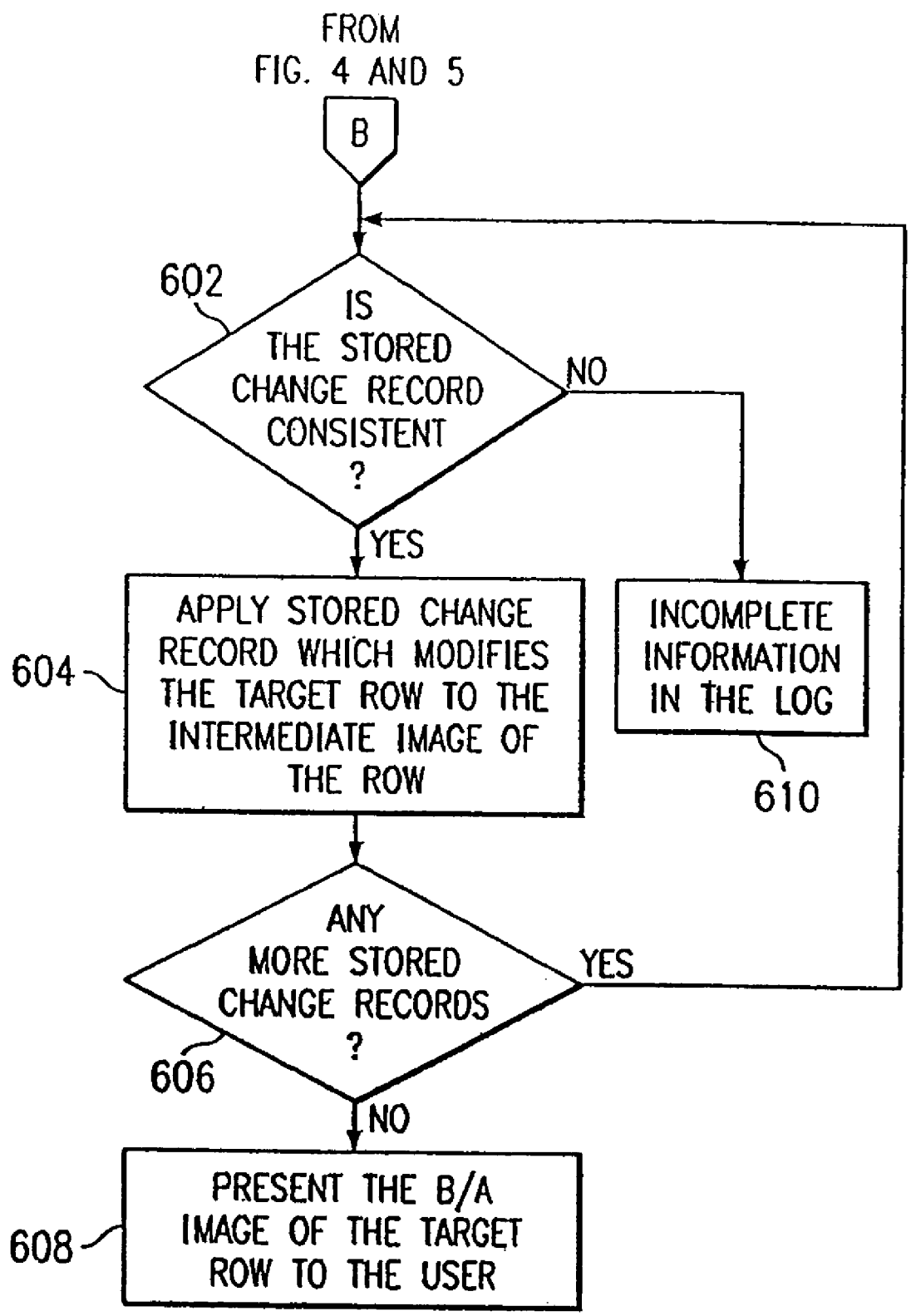
FIG. 6 is a flowchart which contains a portion of the methods described in FIG. 4 and FIG. 5.

FIGS. 4–6 illustrate a method for examining database management system transaction log data (sometimes referred to as just "transaction log data") that can be implemented using the data processing systems and servers shown in FIGS. 1–3. Generally, the method which comprises the present invention finds use with database management systems such as those sold by Sybase, Microsoft, Oracle, Informix, and others. These database management systems maintain transaction logs which detail changes made to the actual database. For example, these transaction logs contain entries that note the change of a particular piece of data which may include the entire row or just describe changes to a portion of a row, the insertion, deletion, or movement of a row, and the splitting, allocation, and deallocation of pages in the database. For database applications using these DBMS systems, this method can be used to provide detailed information for use in transaction auditing, backout, restart, replication actions, and statistical analysis. As used herein, the term "transaction log" refers to both a single transaction log or a set of transaction logs (sometimes referred to as a transaction log set).

The present invention is initiated when a user wishes to view any of the data column values from an entire row in the database as it existed at some point in the past, in addition to data describing the changes made to that row. Typically, a user will wish to view the column data for a row as it existed before and after a change was made to the row. Upon initiation, the present invention accesses the transaction log to determine what changes have been made to a particular row during the past. The present invention then displays these changes, as well as the entire row contents as they existed before and after the change occurred. This process can be useful in recovery situations, as it allows a user to see what changes have been made to a particular row, and when these changes were made.

As described in FIG. 4, the method according to the present invention (hereinafter referred to as the program) starts by chronologically sorting the data in the transaction log to be analyzed, with the oldest data being located at the beginning of the transaction log, and the newest data being located at the end of the log. Also, the program removes any redundant records from the transaction log (401). Next, the program finds a change record of interest (402). A change record of interest may be specified in several ways. For example, a user may wish to display a list of all rows that were edited during certain periods of time, or they may wish to generate a list of all rows on a page that were recently edited. In this situation, the program would search the transaction log to determine what change records exist that note changes made in the time period of interest, or what change records affect a given page. For each change record found that fits the specified criteria, the program would be called to generate a "before and after" image for the row affected by the change record. In another situation, the user may wish to know what row was affected by a given change record. In this situation, the program would generate a single "before and after" representation for the row affected by the change record. The discussion below refers to the change record identified in step 402 as the initial change record, and the row modified by the initial change record as the target row. (As used throughout this application, change records which described changes occurring after the change described by the initial change record are referred to as being located "after" the change record, while records describing changes that occurred before the change described by the initial change record are referred to as being located "before" the change record.)

As used above and throughout the rest of this application, the term "change record" refers to a number of record types encountered in a transaction log, such as page or row reorganization, insertion, deletion, relocation, update, and modify record types, as well as any other type of record which changes the location or value of a row in the database. Insert records are those records which either insert or create a row, while delete records are those records which remove a row. Update and modify types of records change the value of a data item in the database. Relocation records relocate a row, a page, or portions thereof to different pages or locations on the same page.

The specific record types mentioned above can be combined with other related records into a group of records. These groups of records are still considered change records, and, if they contain a specific type of change record, they are considered to be of that type as well. For instance, an insert record is sometimes combined with other records which may not be considered "change" records. In such a case, the group of records containing the insert record will be considered to be an insert type record, as well as a change record.

Once a change record is identified which meets the specified criteria, the record is examined to determine if a complete image of the target row is contained in the record (404). Some change records, such as insert or delete records, will contain a complete image of the target row. In such cases, processing continues at step 608 (discussed below) to recreate the target row as it existed when it was acted upon by the initial change record, and no further searching needs to be conducted in order to find a complete image of the target row. On the other hand, if the change record is simply a modify record (sometimes referred to as a "delta" record) which notes the location of the change, and only the difference between the original row value and the new row value, further processing of the transaction log must occur before a complete "before and after" image of the target row can be displayed to the user. Catalog information extracted from the DBMS system tables is used to assist the interpretation of the number, offset, length, value, and type of each column in a row or change record. This information is useful because it can identify the target row and can indicate if an intermediate change record could potentially apply to the target row.

Assuming that the change record does not contain a complete image of the target row, the initial change record is stored and the transaction log is searched for a change record that contains a complete copy of the target row (406). Initially, as described with reference to FIG. 4, this search examines change records which describe changes that occurred after the change described by the initial change record.

When a change record is located in the transaction log, it is examined (408). During this examination, the program first determines whether the change record contains a complete image of the target row (410). This is the same determination as was made in step 404. If a complete image of the target row is found, processing continues as shown in step 602, described below.

If a complete copy of the target row is not found, the program determines if the record could potentially modify the target row (410). This determination has to be made because the size and location of the target row often cannot be exactly determined until a complete copy of the row is found. Thus, if a change record alters the value of a row on the page containing the target row (the target page), the change record could possibly modify a portion of the target row. When such a change record is encountered, it must be stored so that when the size of the target row is finally determined, the change record can be reexamined to determine if it does in fact modify the target row (412). The records stored in step 412 are referred to as "intermediate change records."

In addition, records which alter the offset of the target row must also be stored so they can be processed later. Examples of records which alter the offset of the target row include deletion and insertion records with offsets less than the target row, and other records which trigger the compaction of rows occurring before the target row on a given page. In addition to being stored, page reorganization records which move the target row to a new page or another location on the same page must be processed immediately so that the program always knows on which page the target row is located.

After a change record is identified and processed, the program checks for the existence of a backup of the portion of the database which contains the target row and which was made at approximately the same time as the change record was stored (414). At this point, the program has determined that the change record being examined does not have a complete copy of the target row. However, if a backup copy of the database exists, a complete image of the target row may be obtained from the backup. If a backup copy of the portion of the database containing the target row exists, the target page is retrieved from the backup copy (418). Next, any consistency data stored with the backup copy of the database is applied to bring the target page up-to-date (420). Finally, the target row is retrieved from the target page and processing continues as shown in step 602, described below (422).

If a backup copy of the database corresponding to the change record examined in step 414 does not exist, the next change record in the transaction log is examined (416). If another change record is found in the transaction log, processing continues at step 408. If no other change records are found in the transaction log, the program determines whether a complete copy of the row is in the current database (426). If a copy of the target row is in the current database, it is retrieved from the database by the DBMS or directly by retrieving the corresponding page and row if the DBMS program is unavailable (428).

Errors in representing a row's contents may be introduced by the possibility that change records which modify the target row exist, but are not included in the set of transaction logs being examined. This will occur if some of the transaction log files created between the time of the initial change record and the current time are not included in the log set. Because a record containing the entire target row was not found, a record which modifies the target row may exist but is not in the transaction log set. Other non-included rows may exist as well. Due to these non-included rows, a user may have to be alerted to the existence of possible errors in the "before and after" images of the target row. If the current database does not contain a complete image of the target row, the DBMS program is unavailable, and transaction logs are detected as missing from the transaction log set, (i.e., if the complete set of log files or the DBMS rows are unavailable), then processing continues as described in FIG. 5 (426).

In general, the method illustrated by FIG. 5 is similar to the method shown in FIG. 4, with the exception that the change records describing changes that occurred before the change described by the initial change record are analyzed. The program starts by flushing all of the intermediate change records that were stored in the previous search, since they are no longer useful (501). Next, the change record occurring before the initial change record is examined (502). If this record contains a complete description of the target row, processing continues as described in FIG. 6 (504, 506). If a complete copy of the target row is not contained in the change record, the intermediate change record is stored if the program determines that the change record could potentially modify the target row (506, 508). The same factors taken into account in step 412 are examined in step 508. If the change record is a page reorganization record, insertion, deletion, or other type of record which indicates that the offset of the target row is changed, or its values could be changed, that record is stored. Also, because the size of the row is still unknown, every record which could potentially modify the target row is stored.

After the change record is processed, the program determines whether a backup copy of the portion of the database containing the target row exists at approximately the same point in time as the change record (510). If a backup copy of the database is found, the target page is retrieved from the backup copy of the database (514). Next, the target page is brought up-to-date by applying any consistency data which is stored along with the database (516). Finally, the target row is extracted from the backup copy of the database, whereupon processing continues as described in step 602 (518). If no copy of the target row is found in a backup, the program continues by examining the remaining change records in the transaction log (512). If the program reaches the end of the transaction log without finding a complete copy of the target row, the program will be unable to recreate a "before and after" image of the target row (524).

Once the program finds a complete copy of the target row, the consistency of the complete copy of the target row relative to the stored change records is checked and the change records are applied to the complete copy of the target row (see FIG. 6). The consistency check determines if all of the changes which have been made to the target row in the period of time between the creation of the initial change record and the creation of the copy of the target row have been accounted for by the stored change records. This type of check is possible because the change records contain the value of a data item before the change described by the change record was implemented, as well as the value of the data item after the change was made to the data item. For example, the stored change records may show that the value of a data item in the target row changed from 0 to 10, 10 to 20, 20 to 30, then 30 to 40. The consistency of the change records in this example would be good, as they show a continuous progression of how a particular data item has changed over time. In another example, the stored change records may show that the value of a data item in the target row changed from 0 to 10, 10 to 20, 20 to 30, then 40 to 50. The consistency of this set of change records would be bad, as there is a discontinuity between the change records describing the changes from 20 to 30 and 40 to 50. Specifically, there is no change record reflecting the change from 30 to 40. In this instance, there is an unknown number of change records missing, and the program knows that it has examined an incomplete transaction log set (610). In operation, the consistency check compares the change described by a change record to the value of the data item described by the change as it exists in the intermediate image of the target row. This occurs because application step 604 applies the previous change records to the target row.

The comparison in step 602 is carried out initially between the complete image of the target row and the last stored change record. Subsequent comparisons examine the stored change records in the reverse order they were stored, i.e., the change records stored toward the end of processes described in FIGS. 4 or 5 are examined first, progressing back to the initial change record.

Next, the change record being examined is applied to an intermediate copy of the target row (604). The semantics for describing this process vary according to whether the target row was found in the forward search conducted in FIG. 4 or the backward search conducted in FIG. 5. For the forward search, the change records are "backed out" of the target row. For instance, if a change record describes a data item in the target row being changed from 10 to 20, the consistency check will first verify that the current value data item in the target row is 20, then the application step will set the value of the data item to 10. For the backward search, the change records are applied in the chronological order they occurred. For instance, if a change record describes a data item in the target row being changed from 10 to 20, the consistency check will verify that the current value of the data item in the target row is 10, the application step will set the value of the data item to 20.

This process continues until all of the stored change records have been applied, and only the initial change record is left. The user is then shown the target row as it existed immediately before the row was altered as described by the initial change record, and immediately after the change described by the initial change record was made to the target row (608).

The previous description details a method used to reconstruct records when one or more indeterminate change records are involved in the row reconstruction. An indeterminate change record is a change record that is characterized by the fact that neither the row or the columns in the row affected by the change described by the indeterminate change record can be exactly determined from the change record itself. Also, as described above, neither the previous value nor the new value of a row affected by a change described by a change record can be fully determined using the information in the initial change record and catalog information from the DBMS. These values can only be determined by using the previously described method to find either a complete row image or additional change records with information missing from the initial change record.

However, in some DBMS systems, the identity of a row and the modified column values can be determined by examining the change records (using DBMS system table information). These change records are referred to as determinate change records. When determinate change records are present on a system, the method described above can be significantly optimized. Optimization is possible because, for each column of interest in a given row, the optimized method only has to find a single change record, since the change record will allow the row and column that it modifies to be determined, in addition to the value of the column in the row.

A description of an optimized version of the method shown in FIGS. 4–6 is illustrated by way of the following example. For the purposes of this example, an initial change record is assumed to have been identified. The initial change record describes a change to a row from table "A". Table "A" has 5 columns: columns 1, 2, 3, 4, and 5. The new value for col. 5 and both the previous and new values for columns col. 1, col. 2, col. 3, and col. 4 are identified as being needed for presentation. There are four change records—A (the initial change record), B, C, and D, all of which are determinant change records for the same row from table "A".

As for the contents of the change records themselves, change record A describes a change only to col. 5 and contains both the previous and new values of column 5—510 and 520, respectively. Change record B describes changes to col. 1 (110 previous, 120 new) and to col. 5 (520 previous, 530 new). Change record C describes changes to col. 1 (120 previous, 130 new) and to col. 2 (210 previous, 220 new). Finally, change record D, contains changes to col. 1 (130 previous, 140 new) and to col. 3 (310 previous, 320 new). At the point in time prior to the change described by change record A, the values of the target row had the following values: col. 1=110, col. 2=210, col. 3=310, col. 4=410, col. and 5=510. The value of the row as it currently exists in the DBMS database data files is: col. 1=140, col. 2=220, col. 3=320, col. 4=410, and col. 5=530.

This improved method is very similar to the method described above in that an initial change record is identified as needing column values presented and the set of column values to be presented is specified (if the set of column values to be presented is not specified, all of the column values are presented). Next, starting at the initial change record, the contents of the initial change record are checked to see whether the record is an indeterminate change record (as identified by the criteria above). If it is an indeterminate change record, then the previous method is applied.

However, if the initial change record is a determinate change record, the set of column values (both before and after the change record was applied) are checked to see whether all these column values can be determined from the current change record. In the example, since change record A only changed col. 5 to 520, the new value for column 5 has been found, but the previous and new values for cols. 1, 2, 3, and 4 cannot be determined from change record A alone. After determining that the initial change record does not contain all of the information needed to present a before and after view of the row, as requested, the method begins scanning the transaction log, looking for change records that affect the page containing the target row. The scanning process initially reviews change records that describe changes that occurred after the change described by the initial change record.

When such a change record is found, the record is analyzed to determine if it is a determinant change record and if it affects the target row. If the change record is not a determinate record (i.e., it is an indeterminate change record), processing continues as described in relation to FIGS. 4–6, since this improved method cannot be used to analyze indeterminate change records. However, if the change record is a determinant change record, the new values, as contained in the change record, for the various columns of the row are compared against the last known values previously identified for each column. This corresponds to the consistency check described for the method shown in FIGS. 4–6. For the example presented above, since the only column value known (at this time) for this row is value of col. 5, the change record identified (assumed to be change record B) is processed to determine if it describes a change for col. 5. Since it does, the change described for change record B is compared to the known value of col. 5 to determine if any inconsistencies exist. In this example, change record A appears to be consistent with change record B because the currently known value of col. 5 is 520 and change record B describes col. 5 being changed from 520 to 530. Change record A is consistent with change record B due to the fact that change record A describes the final value of col. 5 as being 520 and change record B describes the beginning value of col. 5 as 520. If a value for col. 1 was currently known, at this point in the example, a consistency check would have also been performed of that column as well.

After the change record is analyzed for the purposes of a consistency check, the change record column values are reviewed to see if there are any values for columns not previously known. In the example, change record B has previous and new values for col. 1 and col. 5. Since a value for col. 5 has already been found, the col. 5 value is ignored along with any column values not indicated as needing to be presented. Change record B also contains a previous value for col. 1 (110) and new value for col. 1 (120). At this point, for the initial change record, the previous and new value for col. 1 is 110.

If, after processing change record B, all of the columns requiring presentation in the target row have a defined value, the procedure stops the search and presents the values. In the example, however, the values for col. 2, col. 3, and col. 4 are still needed. In this instance, the review of the log file continues in an attempt to identify additional change records that modify the target row. In the example, change record C is eventually encountered. A consistency check of change record C with the previously encountered change records that affect the target row reveals that col. 1's previous value of 120 is consistent. Also, the value of col. 2 at the time of the initial change record is determined to be 210. Finally, change record D is reached. The consistency of this record is verified, and the value of col. 3 at the time of the initial change record is found to be 310.

If the end of the transaction log set is reached and the value of a column requiring presentation has not been determined, then the row as it currently exists in the database data page is retrieved. This retrieval can either occur by using the DBMS application interfaces or, if the program implementing the method has the capability, the row can be retrieved directly from the database data page. At this point, the last previously identified "new" value for each known column is compared against the current value of the same column as it exists in the DBMS as a consistency check. If some columns do not match, an integrity warning or error message is presented which indicates that some transaction log entries are missing. In the example, the values of col. 1 (140), col. 2 (220), col. 3 (320), and col. 5 (510) are compared to values of the target row as it exists in the database.

If all of the values match, the values of the remaining columns that could not be determined from the transaction log are obtained from the retrieved row image. In the example, the value of 410 is retrieved for col. 4 and is presented as both the "before and after" value of col. 4, relative to the initial change record.

If any of the consistency checks fail or the retrieval of a change record or the target row from current DBMS fails, the method stops similarly to the method shown in FIGS. 4–6, and a backward search for unknown column values starting just prior to the initial change record begins. This backward search examines change records that describe changes that occurred before the change described by the initial change record. The search examines the most recent change records first, and proceeds backward in time. In this backward search, the value of a column after the change described by a change record is used as the previous and new column values for the initial change record. This is in contrast to the initial forward search, where the value of a column prior to the change described by a change record is used. Also consistency checks are performed each time a change record is encountered that modifies the target row. Once all of the column values needed are found, the values are presented and the process ends.

If the backward search reaches the beginning of the transaction log without finding values for all of the columns in the target row requiring presentation, the improved method presents the known column values and either indicates a null value for this missing columns or presents an error or warning message stating that all of the column values could not be identified from the current transaction log set.

As described above, the present invention finds use when applied to relational DBMS. However, the present invention can also be used in conjunction with object databases, or with any database system which tracks changes to objects in the database using transaction log files that contain records describing changes that have been made to the objects in the database.

As indicated above, aspects of this invention pertain to specific "method functions" implementable on computer systems. In an alternate embodiment, the invention may be implemented as a computer program product for use with a computer system. Those skilled in the art should readily appreciate that programs defining the functions of the present invention can be delivered to a computer in many forms, which include (as shown in FIG. 2), but are not limited to: (a) information permanently stored on non-writable storage media (e.g. read only memory devices within a computer such as ROMs or CD-ROM disks readable only by a computer I/O attachment); (b) information alterably stored on writable storage media (e.g. floppy disks and hard drives); or (c) information conveyed to a computer through communication media, such as a local area network, a telephone network, or a public network like the Internet. It should be understood, therefore, that such media, when carrying computer readable instructions that direct the method functions of the present invention, represent alternate embodiments of the present invention.

While the invention has been particularly shown and described with reference to a preferred embodiment, it will be understood by those skilled in the art that various changes in form and detail may be made therein without departing from the spirit and scope of the invention.

What is claimed:

1. A method for displaying how a row in a database table appeared both before and after it was modified as described by a change record in a transaction log file, the method comprising:
   providing a database comprising tables, which, in turn, comprise rows;
   providing a transaction log file comprising change records that describe modifications that have been made to the database;
   selecting an initial change record in the transaction log file, wherein the initial change record describes a change that has been made to a particular row in a database table;
   searching the transaction log file for additional change records that could also modify the particular row, comprising the steps of searching the transaction log for change records existing after the initial change record that could modify the particular row and, if a complete copy of the initial change record is not found while searching the transaction log file for change records existing after the initial change record, then searching the transaction log file for change records existing before the initial change record that could modify the particular row;
   locating a particular change record that contains a complete copy of the particular row in the transaction log file, if such particular change record exists in the transaction log file; and
   applying the additional change records to the complete copy of the particular row, wherein the complete copy of the particular row is brought to a state as it existed before the change described by the initial change record was made to the particular row, displaying how the particular row in the database table appeared both before and after it was modified as described by the initial change record in the transaction log file.

2. The method as described in claim 1, further comprising the step of storing all of the additional change records that could modify the particular row.

3. The method as described in claim 1, the method further comprising:
   applying the initial change records to the complete copy of the particular row; and
   displaying to a user the complete copy of the particular row as it existed both before the change described by the initial change record was implemented and after the change was implemented.

4. The method as described in claim 1, wherein the particular change record that contains a complete copy of the particular row is an insert record type that created the particular row.

5. The method as described in claim 1, wherein the particular change record that contains a complete copy of the particular row is a delete record type that deleted the particular row.

6. The method as described in claim 1, wherein the particular change record that contains a complete copy of the particular row is a record that alters the particular row.

7. The method as described in claim 1, wherein searching the transaction log file for additional change records that could also modify the particular row further comprises processing all change records that cause the particular row to move from one location to another in the database as such change records are encountered.

8. The method as described in claim 1, wherein the step of locating the particular change record that contains the complete copy of the particular row in the transaction log file, if such particular change record exists in the transaction log file, further comprises obtaining the complete copy of the particular row from a backup copy of the database if the particular change record containing a complete copy of the particular row is not found in the transaction log file.

9. The method as described in claim 1, wherein the step of locating the particular change record that contains the complete copy of the particular row in the transaction log file, if such particular change record exists in the transaction log file, further comprises obtaining the complete copy of the particular row from the database if the particular change record containing a complete copy of the particular row is not found in the transaction log file.

10. The method as described in claim 1, the method further comprising:
sorting the transaction log file; and
removing redundant change records from the transaction log file.

11. A data processing system for displaying how a row in a database table appeared both before and after it was modified as described by a change record in a transaction log file, the data processing system comprising:
memory for storing digital information;
a processor, connected to the memory, for operating upon the digital information in the memory;
a database that contains tables, which, in turn, contain rows;
a transaction log file that contains change records that describe modifications that have been made to the database;
the data processing system being operable in an displaying mode of operation, wherein
an initial change record in the transaction log file is selected, wherein the initial change record describes a change made to a particular row located in a database table;
a transaction log file is searched for additional change records that could modify the particular row and, if a complete copy of the particular row is not found, searching the transaction log file for change records existing before the initial change record that could modify the particular row;
a particular change record containing a complete copy of the particular row is located in the transaction log file, if such particular change record exists in the transaction log file; and
the additional change records are applied to the complete copy of the particular row, wherein the complete copy of the particular row is brought to a state as it existed before the change described by the initial change record was made to the particular row, displaying how the particular row in the database table appeared both before and after it was modified as described by the initial change record in the transaction log file.

12. The data processing system as described in claim 11, wherein the illustration mode of operation further comprises:

the initial change record being applied to the complete copy of the particular row; and
the complete copy of the particular row being displayed to a user as it existed both before the change described by the initial change record was implemented and after the change was implemented.

13. The data processing system as described in claim 11, wherein the initial change record that contains a complete copy of the particular row is an insert record that created the particular row.

14. The data processing system as described in claim 11, wherein the initial change record that contains a complete copy of the particular row is a delete record that deleted the particular row.

15. The data processing system as described in claim 11, wherein the initial change record that contains a complete copy of the particular row is a record that alters the particular row.

16. The data processing system as described in claim 11, wherein the displaying of mode of operation further comprises all change records being processed that cause the particular row to move from one location to another in the database as such change records are encountered.

17. The data processing system as described in claim 11, wherein the displaying mode of operation further comprises the complete copy of the particular row being obtained from a backup copy of the database, if the particular change record containing a complete copy of the particular row does not exist in the transaction log file.

18. The method as described in claim 11, wherein the displaying mode of operation further comprises:
the transaction log file being sorted; and
redundant change records being removed from the transaction log file.

19. A computer program product having stored computer-readable instructions for displaying how a row in a database table appeared both before and after it was modified as described by a change record in a transaction log file, the computer program product comprising:
a database that contains tables, which, in turn, contain rows;
a transaction log file that contains change records that describe modifications that have been made to the database;
means for selecting an initial change record in the transaction log file, wherein the initial change record describes a change made to a particular row located in the database table;
means for searching a transaction log file for additional change records that could modify the particular row, comprising means for searching the transaction log file for change records existing after the initial change record that could modify the particular row and means for searching the transaction log file for change records existing before the initial change record that could modify the particular row;
means for locating a particular change record containing a complete copy of the particular row in the transaction log file, if such particular change record exists in the transaction log file; and
means for applying the additional change records to the complete copy of the particular row, wherein the complete copy of the particular row is brought to a state as it existed before the change described by the initial change record was made to the particular row, displaying how the particular row in the database table appeared both before and after it was modified as described by the initial change record in the transaction log file.

20. The computer program product as described in claim 19, further comprising:
means for applying the initial change record to the complete copy of the particular row; and
means for displaying to a user the complete copy of the particular row as it existed both before the change described by the initial change record was implemented and after the change was implemented.

21. The computer program product as described in claim 19, wherein the particular change record that contains a complete copy of the particular row is an insert record type that created the particular row.

22. The computer program product as described in claim 19, wherein the particular change record that contains a complete copy of the particular row is a delete record type that deleted the particular row.

23. The computer program product as described in claim 19, wherein the particular change record that contains a complete copy of the particular row is a record that alters the particular row.

24. The computer program product as described in claim 19, wherein the means for searching the transaction log file for the additional change records that could modify the particular row further comprises means for processing all change records that cause the particular row to move from one location to another in the database as such change records are encountered.

25. The computer program product as described in claim 19, wherein the means for locating the particular change record containing the complete copy of the particular row in the transaction log file, if such particular change record exists in the transaction log file, further comprises means for obtaining the complete copy of the particular row from the database, if the particular change record containing a complete copy of the particular row does not exist in the transaction log file.

26. The computer program product as described in claim 19, the computer program product further comprising:
means for sorting the transaction log file; and
means for removing redundant change records from the transaction log file.

27. A method for displaying changes that have been made to an electronic database, the method comprising:
selecting an initial change record, wherein the initial change record describes a change made to a particular row in the electronic database;
identifying portions of the particular row to be displayed as they existed when the change described by the initial change record was made;
obtaining a complete copy of the particular row in a transaction log file;
searching the transaction log file for change records that identify values of selected portions of the particular row, comprising the steps of searching the transaction log for change records existing after the initial change record that could modify the particular row and, if a complete copy of the initial change record is not found while searching the transaction log file for change records existing after the initial change record, then searching the transaction log file for change records existing before the initial change record that could modify the particular row;
storing the values; and
displaying the particular row and the stored values, wherein the particular row is brought to a state as it existed before the change described by the initial change record was made to the particular row, displaying the changes that have been made to the portions of the electronic database.

28. The method as described in claim 27, the method further comprising verifying the consistency of the stored values and subsequently encountered change records.

29. The method as described in claim 28, further comprising verifying the consistency of the stored values with values for the particular row stored in the database.

30. A data processing system for displaying changes that have been made to portions of an electronic database, the data processing system comprising:
memory for storing digital information;
a processor, connected to the memory, for operating upon the digital information in the memory;
the data processing system being operable in an displaying mode of operation, wherein
an initial change record is selected, wherein the initial change record describes a change made to a particular row in the electronic database;
portions of the particular row to be displayed as they existed when the change described by the initial change record was made are identified by a user;
a transaction log file is searched for change records that identify values of selected portions of the particular row, whereby the transaction log file is searched for change records that existed after the initial change record that could modify the particular row and, if a complete copy of the initial change record is not found, then the transaction log file is searched for change records that existed before the initial change record that could modify the particular row;
the values obtained from the change records are stored in the memory;
a complete copy of the particular row is identified by examining the values obtained from the change records in the transaction log file; and
the particular row and the stored values are displayed, wherein the particular row is brought to a state as it existed before the change described by the initial change record was made to the particular row, displaying the changes that have been made to the portions of the electronic database.

31. The data processing system as described in claim 30, wherein the displaying mode of operation further comprises verifying the consistency of the stored values and subsequently encountered change records.

32. The data processing system as described in claim 31, wherein the displaying mode of operation further comprises the consistency of the stored values being verified with values for the particular row stored in the database.

* * * * *